US007974535B2

(12) United States Patent
Nakamura

(10) Patent No.: US 7,974,535 B2
(45) Date of Patent: Jul. 5, 2011

(54) REMOTE CONTROL SYSTEM

(75) Inventor: Hiroshi Nakamura, Saitama (JP)

(73) Assignee: Pioneer Corporation, Tokyo (JP)

(*) Notice: Subject to any disclaimer, the term of this patent is extended or adjusted under 35 U.S.C. 154(b) by 721 days.

(21) Appl. No.: 11/887,279

(22) PCT Filed: Mar. 6, 2006

(86) PCT No.: PCT/JP2006/304252

§ 371 (c)(1), (2), (4) Date: May 14, 2008

(87) PCT Pub. No.: WO2006/103876

PCT Pub. Date: Oct. 5, 2006

(65) Prior Publication Data

US 2009/0067847 A1 Mar. 12, 2009

(30) Foreign Application Priority Data

Mar. 28, 2005 (JP) ................................ P2005-092848

(51) Int. Cl.
*H04B 10/00* (2006.01)

(52) U.S. Cl. .......................... 398/106; 398/107; 398/109

(58) Field of Classification Search .................. 398/106, 398/107, 109, 108, 128, 130

See application file for complete search history.

(56) References Cited

U.S. PATENT DOCUMENTS

| | | | | |
|---|---|---|---|---|
| 6,225,938 | B1 * | 5/2001 | Hayes et al. | 341/176 |
| 6,570,524 | B1 * | 5/2003 | Mullaly et al. | 341/176 |
| 7,224,903 | B2 * | 5/2007 | Colmenarez et al. | 398/106 |
| 2002/0174270 | A1 * | 11/2002 | Stecyk et al. | 710/1 |

FOREIGN PATENT DOCUMENTS

| | | |
|---|---|---|
| JP | 4-103294 | 4/1992 |
| JP | 5-93188 | 4/1993 |
| JP | 5-303466 | 11/1993 |
| JP | 6-303452 | 10/1994 |
| JP | 9-163474 | 6/1997 |
| JP | 2003-111171 | 4/2003 |

* cited by examiner

*Primary Examiner* — M. R. Sedighian

(74) *Attorney, Agent, or Firm* — Drinker Biddle & Reath LLP

(57) ABSTRACT

A quick selection of a depression key provided with a remote controller is impeded, so that controllable characteristics of the remote controller are deteriorated, and a lifetime of a cell provided on the side of the remote controller is reduced in order to acquire transport motional information.

While a remote control system is equipped with the remote controller and an infrared communication apparatus 33, a pattern for reflecting diffraction light by illumination light is provided with the remote controller, whereas a transmitting/receiving unit 37 and a control unit 39 are provided with the infrared communication apparatus 33. A light emitting unit 11 for emitting light to the pattern, and a light receiving unit 17 for receiving reflection light from the pattern are provided with the transmitting/receiving unit 37. A detecting unit 41 for detecting intensity of the light received by the light receiving unit 17, a calculating unit 43 for binary-processing the intensity of the detected light to obtain binary information in response to the intensity of the detected light, and a converting unit 45 for converting the binary information into a control signal for a main appliance are provided with the control unit 39.

5 Claims, 4 Drawing Sheets

REMOTE CONTROL SYSTEM

TECHNICAL FIELD

The present invention is related to a remote control system. More specifically, the present invention is directed to a remote control system for transmitting/receiving signals by infrared communication apparatuses which are provided on a main appliance and a counter appliance (infrared remote controller etc.)

BACKGROUND ART

For instance, in A/V (AudioVisual) appliances such as television receivers, VTRs, and CD players, and also, in various sorts of electronic appliances such as air conditioners and lighting equipments, infrared communications is widely utilized as wireless communications. In infrared communications, signals are transmitted/received by operating infrared communication apparatuses which are provided in main appliances (television receivers etc.) and counter appliances (infrared remote controllers etc.) (refer to, for example, Patent document 1).

As shown in FIG. 1, such an infrared communication apparatus 1 is arranged by a transmitting/receiving unit 3 and a control unit 5.

The transmitting/receiving unit 3 is arranged by a light emitting unit 11 and a light receiving unit 17. The light emitting unit 11 is constituted by an LED 7 and an LED driver 9. The light receiving unit 17 is constituted by a photodiode 13 and a reception amplifier 15. Also, the control unit 5 is arranged by a modulator 19 and a demodulator 21. The modulator 19 modulates transmission data so as to transfer the modulated transmission data to the light receiving unit 11. The demodulator 21 demodulates a signal received by the light receiving unit 17 and converts the demodulated signal into reception data.

Such an infrared communication apparatus 1 is operated as follows: That is, the transmission data is modulated by the modulator 19 in a pulse-width modulating method. Thereafter, the pulse-width modulated transmission data is transferred to the LED driver 9 so as to be converted into an optical signal by the LED 7. On the other hand, an optical signal transmitted from a communication counter unit is converted into an electric signal by the photodiode 13. Thereafter, the converted electric signal is amplified by the reception amplifier 15, and the amplified signal is demodulated by the demodulator 21, and then, the demodulated signal is outputted as reception data.

Patent document 1; JP-A-6-303452

DISCLOSURE OF THE INVENTION

Problems that the Invention is to Solve

However, in conventional infrared remote controllers equipped with infrared communication apparatuses and the like, since operation keys are depressed, converted transmission data are merely transmitted from LEDs as optical signals to main appliances such as television receivers.

That is to say, when users turn ON power supplies of main appliances, the users firstly grip remote controllers, and thereafter, select power supply keys from a plurality of operation keys to depress the selected power supply keys, so that the power supplies of the main appliances are turned ON. As a consequence, when quick operations are required, or when the operation keys cannot be visibly recognized in the dark, quick selections of depression keys are impeded. Accordingly, there is such a problem that controllable characteristics of the remote controllers are deteriorated. In contract to the above-explained pointing devices, other remote controllers are proposed. That is, since this kind of remote controllers are inclined, transmission data are transmitted to main appliances.

This kind of remote controllers contain, for example, angular velocity sensors (vibration gyroscopes); output voltages from the angular velocity sensors are applied to amplifying units; the amplified sensor voltages are converted into digital voltage data as digital voltage values by A/D converters; and then, the digital voltage values are outputted so as to acquire motional information. As a result, circuits of these remote controllers become complex and high cost, and power consumption thereof is increased. More specifically, in cell-driven type remote controllers, consumed cells must be frequently replaced by new cells, which lowers practicability of the cell-driven type remote controllers.

As problems that the present invention is to solve, such a problem may be conceived as one example. That is, since the quick selections of the depression keys employed in remote controllers are impeded, there is such a problem that the controllable characteristics of the remote controllers are deteriorated. Also, in order to acquire transport motional information, there is another problem that lifetimes of cells provided in the remote controllers are reduced.

Means for Solving the Problems

A remote control system of the present invention is featured by such a remote control system comprising: a remote controller for remotely controlling a main appliance; and an infrared communication apparatus provided with the main appliance; a plurality of patterns having diffraction patterns different from each other, for producing diffraction light, the light intensity of which is different from each other in response to a change in incident angles of light to be illuminated are provided with the remote controller; a transmitting/receiving unit and a control unit; a light emitting unit for emitting light to the pattern, and a light receiving unit for receiving reflection light reflected from the pattern; and a detecting unit for detecting a change in intensity of the diffraction light received by the light receiving unit, a calculating unit for binary-processing the detected light intensity to obtain binary information in response to the intensity of the light, and a converting unit for converting the binary information into a control signal for the main appliance, wherein the transmitting/receiving unit and the control unit are provided with the infrared communication apparatus; the light emitting unit and the light receiving unit are provided with the transmitting/receiving unit; and the detecting unit, the calculating unit and the converting unit are provided with the control unit.

BEST MODE FOR CARRYING OUT THE INVENTION

Referring now to drawings, remote control systems according to embodiment modes of the present invention will be descried.

FIG. 2 is a block diagram for representing a schematic structure of a remote control system according to an embodiment mode of the present invention. FIG. 3 is a block diagram for showing an arrangement of an infrared communication apparatus shown in FIG. 2. FIG. 4 is a perspective view for showing an enlarged major portion of a remote controller.

It should be understood that the same reference numerals shown in FIG. 1 will be employed as those for denoting the same structural elements indicated in the drawings, and overlapped explanations thereof are omitted.

As shown in FIG. 2, the remote control system 100 is mainly arranged by an infrared communication apparatus 33 and a remote controller 35. The infrared communication apparatus 33 is provided in a television receiver 31 corresponding to a main appliance (namely, A/V appliance such as television receiver, VTR, and CD player; air conditioner; lighting equipment etc.). The remote controller 35 remotely controls the above-described main appliance by a wireless manner, or the like.

As represented in FIG. 3, the infrared communication apparatus 33 is arranged by a transmitting/receiving unit 37 and a control unit 39. The transmitting/receiving unit 37 is arranged by a light emitting unit 11, and a light receiving unit 17. The light receiving unit 11 is constituted by an LED 7 and an LED driver 9. The light receiving unit 17 is constituted by a photodiode 13 and a receiving amplifier 15.

Also, the control apparatus 39 is arranged by a modulator 19, a demodulator 21, a detecting unit 41, a calculating unit 43, and a converting unit 45. The modulator 19 modulates transmission data so as to transfer the modulated transmission data to the light emitting unit 11. The demodulator 21 demodulates a signal received by the light receiving unit 17 so as to convert the received signal into reception data. The detecting unit 41 detects light intensity of diffraction light from the signal received by the light receiving unit 17. The converting unit 45 is connected via an interface (not shown) to a main appliance such as a television receiver 31.

The LED 7 and the photodiode 13 are provided on the same side with respect to the remote controller 35. In particular, the photodiode 13 is installed at such a position that the photodiode 13 is capable of detecting diffraction light which is reflected from the remote controller 35.

The remote controller 35 has a function capable of displaying a displacement amount caused by movement. In other words, as shown in FIG. 4, patterns 47*a* and 47*b* which modulate incident light based upon incident angles are provided on a plane 35*a* which is located opposite to the infrared communication apparatus 33. The patterns 47*a* and 47*b* are formed by, for example, line-shaped patterns which are provided at predetermined interval along a displacement direction of the remote controller 35, namely, an X-Y direction of the remote controller 35.

Although this line-shaped pattern is indicated as the patterns formed along the X-Y direction in the indicated example, this pattern may be alternatively formed by such a pattern which is inclined at a predetermined angle. Moreover, this pattern may be alternatively constituted not by the line-shaped pattern. It should also be noted that in FIG. 4, reference numeral 49 indicates an operation key, and reference numeral 51 shows an LED.

The patterns 47*a* and 47*b* have such a function as an encoder, while the encoder produces a diffraction pattern by light which is illuminated from the light emitting unit 11 of the infrared communication apparatus 33 to the remote controller 35. The patterns 47*a* and 47*b* are constituted by, for example, a hologram 47.

The hologram 47 implies that in holography, both an amplitude and a phase of object light which passes through, or is reflected from an object, are recorded on a photosensitive material by utilizing interference with respect to reference light. Both the amplitude and the phase of the object light are recorded on the hologram 47 as a change in contrast and a lateral shift of interference fringes.

As a consequence, for example, if the hologram 47 is illuminated by using the original reference light, then such a light having the same amplitude and the same phase as those of the object light by the diffraction of the light. The hologram 47 produces diffraction light having different intensity from each other which are caused by a change in incident angles of the light illuminated onto the respective patterns 47*a* and 47*b* (namely, hologram 47 performs optical modulation). In other words, reflection light is optically modulated by moving the remote controller 35.

In this embodiment, an optical modulation implies that an amplitude (intensity), a phase, and a vibration plane of light are changed in a temporal manner. As a consequence, since these sets of the diffraction light are received, a plurality of signals may be acquired from the patterns 47*a* and 47*b*.

It should also be understood that different sorts of holograms 42 may be alternatively provided on different planes of the remote controller 35. With employment of such an alternative arrangement, the respective planes of the remote controller 35 where the holograms 47 are formed are directed to the infrared communication apparatus 33 of the main appliance, so that different signals may be sent out, for example, a power ON/OFF signal, a sound suppressing signal, or the like may be transmitted.

The detecting unit 41 contains a light receiving element for detecting light intensity of reflection light. The calculating unit 43 binary-processes a signal detected by the detecting unit 41 in response to intensity of respective diffraction light. The converting unit 45 can output a control signal of the main appliance based upon the binary data which is out putted from the calculating unit 43. The converting unit 45 is arranged by employing, for instance, a CPU and a memory.

Next, a description is made of operations as to the remote control system with employment of the above-described arrangement.

The hologram 47 where the patterns 47*a* and 47*b* are formed is attached to the remote controller 35. In other words, reflection light reflected from the hologram 47 of the remote controller 35 is received by the light receiving unit 17 of the infrared communication apparatus 33.

Under such a condition that the remote controller 35 are under stationary state, as the reflection light received by the light receiving unit 17, diffraction light having predetermined intensity is being received. The detecting unit 41 detects intensity of light from the diffraction light of the received reflection light. This detection information is outputted to the calculating unit 43, and then, is binary-processed in response to the light intensity. The binary-processed light intensity is outputted to the converting unit 45 so as to be converted into, for example, a power ON/OFF signal of the television receiver 31. This power ON/OFF signal is supplied to a power supply control circuit, or the like (not shown) of the television receiver 31. In other words, when the remote controller 35 is under stationary state, the power supply of the television receiver 31 is kept under OFF state.

On the other hand, when the remote controller 35 is gripped by the user and is moved by this user, the light intensity of the diffraction light reflected from the hologram 47 is changed (namely, modulated) and then the changed light intensity is detected. This detection information is outputted to the calculating unit 43 and is binary-processed in response to the light intensity in a similar manner to the above-described signal processing manner. The binary-processed light intensity is outputted to the converting circuit 45 so as to be converted into a power ON/OFF signal. In other words, when the remote controller 35 is gripped, the power ON/OFF signal is inputted to the power control circuit, or the like of the television receiver 31, so that the power supply of the television receiver 31 is turned ON.

As previously described, in such a case that the control signal corresponds to the power supply ON/OFF signal of the main appliance, the movement of the remote controller 35 is detected by the infrared communication apparatus 33 by that only the remote controller 35 under stationary state is merely gripped, so that the power ON/OFF signal is transmitted to the main appliance. As a consequence, the quick operation of the power switch can be realized, and also, the transmission of the power ON/OFF signal can be transmitted in the dark without any key manipulation, so that the controllable characteristic of the remote controller can be improved.

As previously described, in detail, the remote control system 100, according to the present embodiment mode, is equipped with: the remote controller 35 which remotely controls the television receiver 31 corresponding to the main appliance; and the infrared communication apparatus 33 which is provided in the television receiver 31. Then, the patterns 47*a* and 47*b* for reflecting the diffraction light by the illumination light are provided on the remote controller 35; the transmitting/receiving unit 37 and the control unit 39 are provided with the infrared communication apparatus 33; the light emitting unit 11 for emitting the light to the patterns 47*a*, 47*b*, and the light receiving unit 17 for receiving the reflection light reflected from the patterns 47*a* and 47*b* are provided with the transmitting/receiving unit 37; and the detecting unit 41 for detecting the intensity of the light received by the light receiving unit 11, the calculating unit 43 for binary-processing the detected light intensity to obtain the binary information in response to the intensity of the light, and the converting unit 45 for converting the binary information into the control signal of the television receiver 31.

As a consequence, the transport motional information of the remote controller 35 can be detected without reducing the lifetime of the cell provided on the remote controller 35.

As a result, the controllable characteristic of the remote controller 35 can be improved.

It should also be understood that the above-described embodiment mode has described such an example that the main appliance is the television receiver 31. Even when the remote control system according to the present invention is applied to A/V appliances such as VTRs and CD players, and various sorts of electronic appliances such as air conditioners and lighting equipments in addition to the television receiver 31, similar operations/effects to those of the above-explained television receiver 31 may be achieved.

DESCRIPTION OF REFERENCE NUMERALS AND SIGNS

Figure 1:
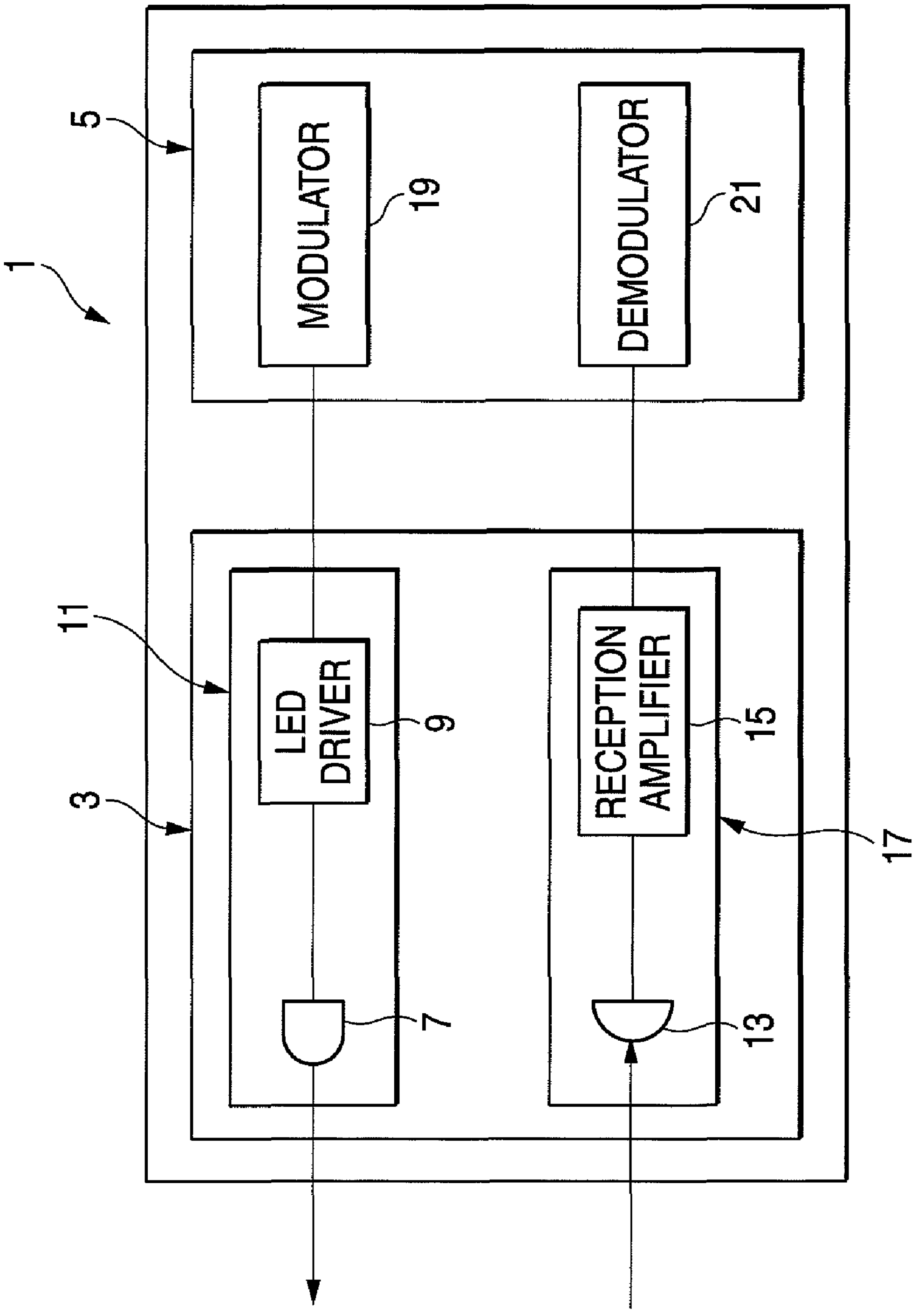
FIG. 1 is a block diagram for showing the schematic arrangement of the conventional infrared communication apparatus.
Figure 2:
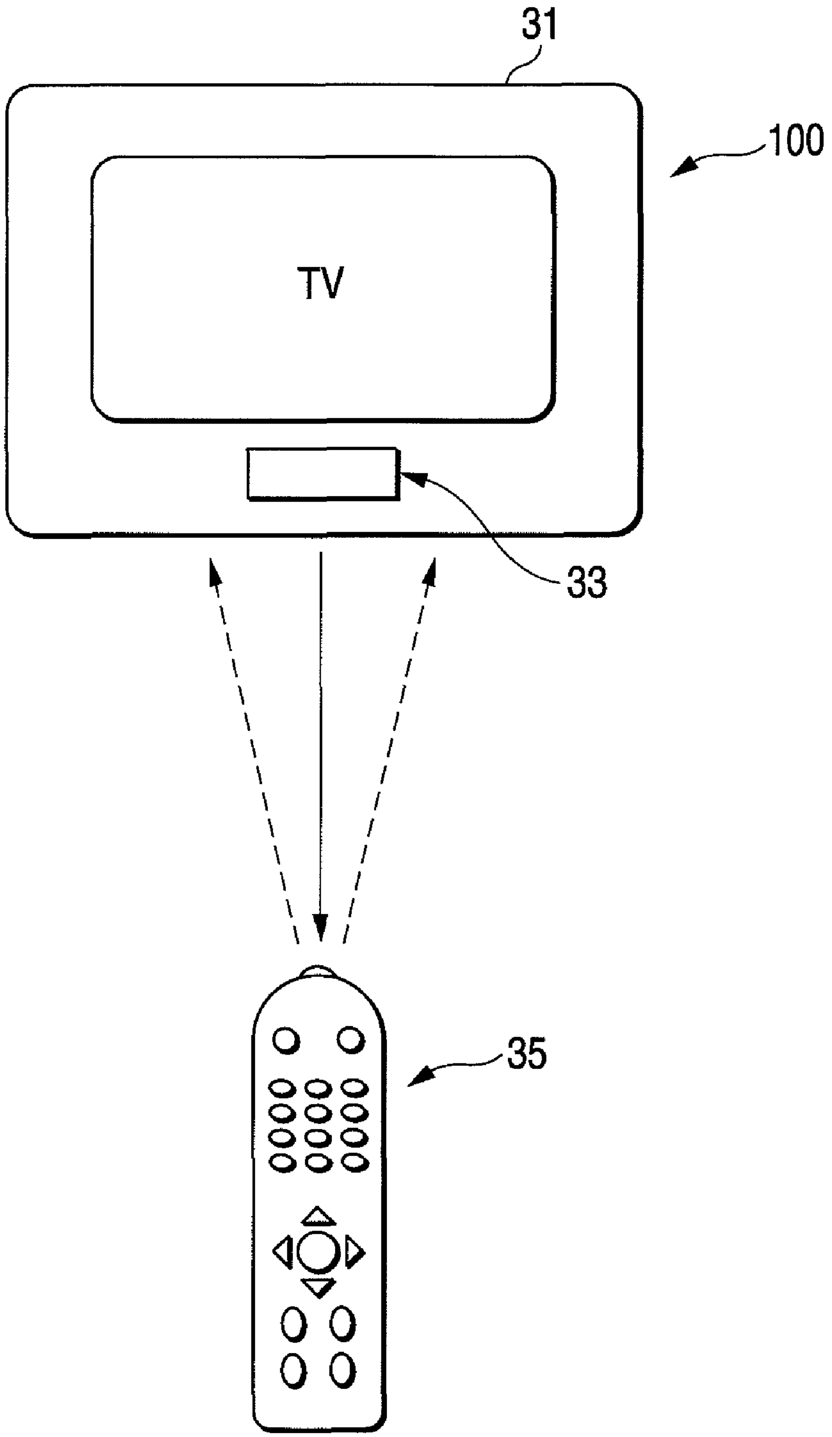
FIG. 2 is a block diagram for representing a schematic arrangement of a remote control system according to an embodiment mode of the present invention.
Figure 3:
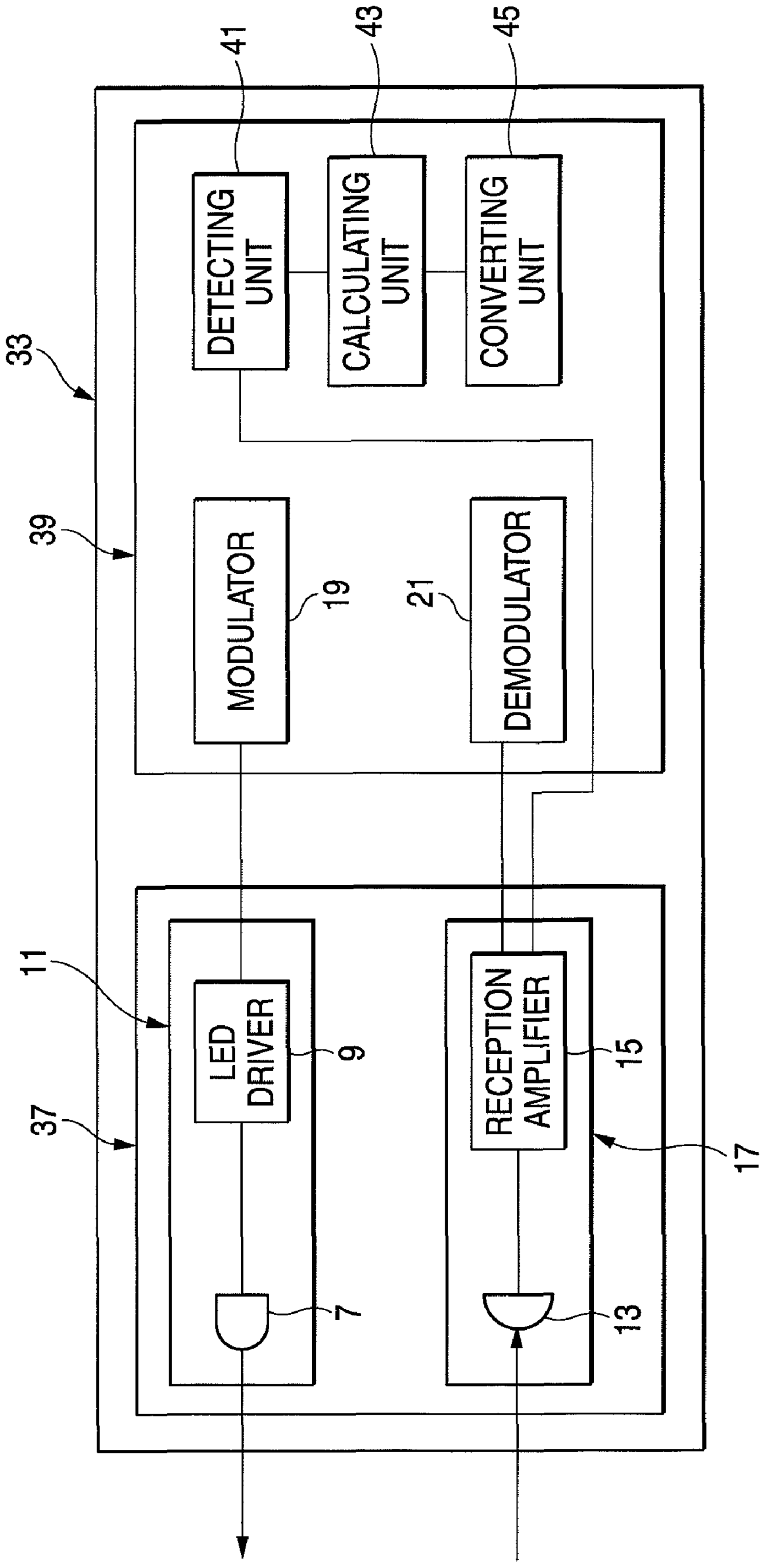
FIG. 3 is a block diagram for indicating an arrangement of an infrared communication apparatus indicated in FIG. 2.
Figure 4:
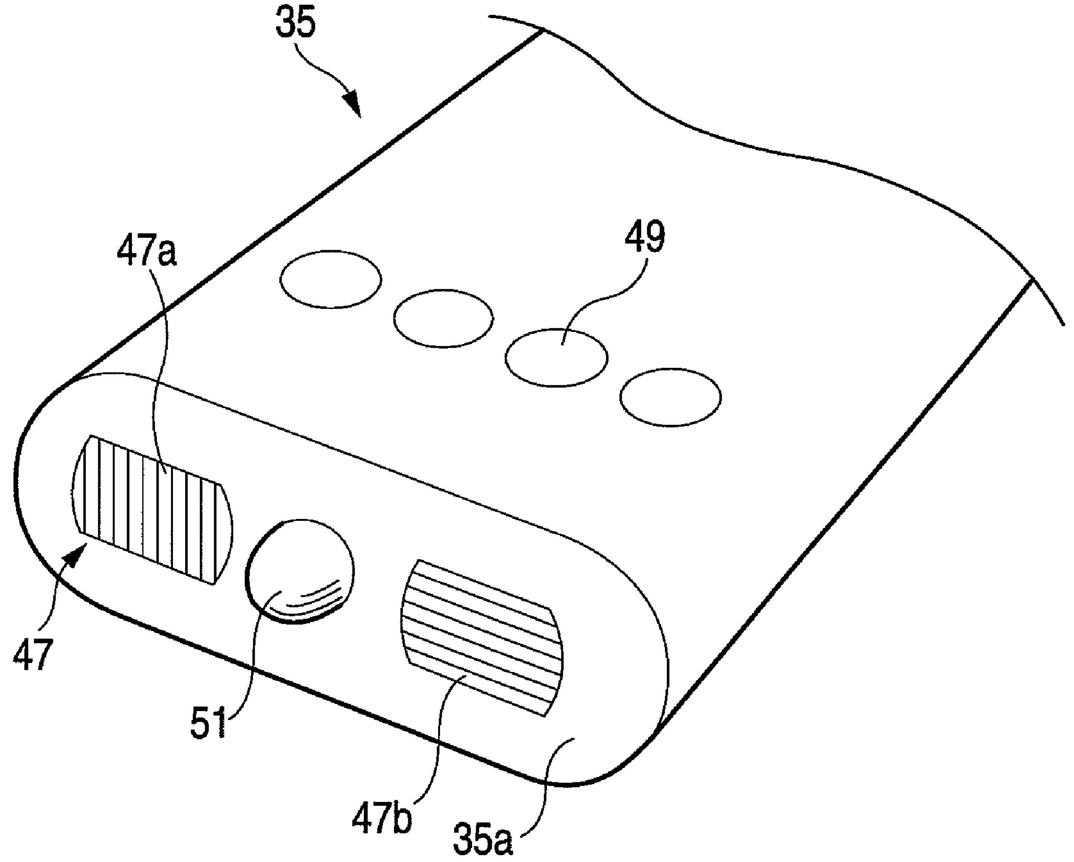
FIG. 4 is a perspective view for indicating an enlarged major portion of a remote controller.

11 light emitting unit
17 light receiving unit
31 television receiver (main appliance)
33 infrared communication apparatus
35 remote controller
37 transmitting/receiving unit
39 control unit
41 detecting unit
43 calculating unit
45 converting unit
47 hologram
47*a*, 47*b* pattern

The invention claimed is:

1. A remote control system comprising:

a remote controller that remotely controls a main appliance;

an infrared communication apparatus provided with the main appliance;

a plurality of patterns having diffraction patterns different from each other, for producing diffraction light, the light intensity of which is different from each other in response to a change in incident angles of light to be illuminated are provided with the remote controller;

a transmitting/receiving unit;

a control unit;

a light emitting unit that emits light to the pattern;

a light receiving unit that receives reflection light reflected from the pattern;

a detecting unit that detects a change in intensity of the diffraction light received by the light receiving unit;

a calculating unit that binary-processes the detected light intensity to obtain binary information in response to the intensity of the light; and a converting unit that converts the binary information into a control signal for the main appliance, wherein:

the transmitting/receiving unit and the control unit are provided with the infrared communication apparatus;

the light emitting unit and the light receiving unit are provided with the transmitting/receiving unit; and the detecting unit, the calculating unit and the converting unit are provided with the control unit.

2. The remote control system according to claim 1, wherein the pattern is a hologram.

3. The remote control system according to claim 2, wherein different sorts of holograms are provided on different planes of the remote controller.

4. The remote control system according to claim 1, wherein the control signal is a power ON/OFF signal of the main appliance.

5. The remote control system according to claim 1, wherein the plurality of patterns are line-shaped patterns having inclined angles which are different from each other.

* * * * *